(12) United States Patent
Safaei Mahmoudabadi et al.

(10) Patent No.: US 10,689,584 B2
(45) Date of Patent: Jun. 23, 2020

(54) OXIDATIVE DESULFURIZATION OF LIQUID FUELS USING METAL SULFIDE QUANTUM DOTS/GRAPHEN OXID HYBRID NANOCATALYST

(71) Applicants: Zohal Safaei Mahmoudabadi, Tehran (IR); Alimorad Rashidi, Tehran (IR); Ahmad Tavasoli, Tehran (IR); Mansour Bazmi, Tehran (IR); Hajjar Farshidi, Tehran (IR)

(72) Inventors: Zohal Safaei Mahmoudabadi, Tehran (IR); Alimorad Rashidi, Tehran (IR); Ahmad Tavasoli, Tehran (IR); Mansour Bazmi, Tehran (IR); Hajjar Farshidi, Tehran (IR)

( * ) Notice: Subject to any disclaimer, the term of this patent is extended or adjusted under 35 U.S.C. 154(b) by 0 days.

(21) Appl. No.: 16/288,114

(22) Filed: Feb. 28, 2019

(65) Prior Publication Data
US 2019/0194556 A1 Jun. 27, 2019

Related U.S. Application Data

(60) Provisional application No. 62/636,837, filed on Feb. 28, 2018.

(51) Int. Cl.
| | | |
|---|---|---|
| *C10G 53/14* | (2006.01) | |
| *C10G 27/14* | (2006.01) | |
| *B01J 27/051* | (2006.01) | |
| *B01J 35/00* | (2006.01) | |
| *B01J 21/18* | (2006.01) | |
| *B01J 37/04* | (2006.01) | |

(Continued)

(52) U.S. Cl.
CPC ............ *C10G 53/14* (2013.01); *B01J 21/18* (2013.01); *B01J 27/043* (2013.01); *B01J 27/047* (2013.01);
(Continued)

(58) Field of Classification Search
CPC ............... C10G 27/04–14; C10G 53/14; B01J 27/04–0515; B01J 35/0013; Y02S 77/775–777
See application file for complete search history.

(56) References Cited

U.S. PATENT DOCUMENTS

| | | |
|---|---|---|
| 7,276,152 B2 | 10/2007 | Lin et al. |
| 2011/0143229 A1 | 6/2011 | Chellappa et al. |
| 2015/0252272 A1* | 9/2015 | Chavan .................. B01J 23/002 585/850 |

OTHER PUBLICATIONS

Betiha, Mohamed A. et al., Oxidative desulfurization using graphene and its composites for fuel containing thiophene and its derivatives: An update review, Egyptian Journal of Petroleum, Dec. 2017, pp. 715-730.*

(Continued)

*Primary Examiner* — Renee Robinson
(74) *Attorney, Agent, or Firm* — Bajwa IP Law Firm; Haris Zaheer Bajwa

(57) ABSTRACT

A method for oxidative desulfurization of liquid hydrocarbon fuels is disclosed. The method includes contacting a liquid fuel with a quantum dot hybrid catalyst including metal sulfide quantum dots intercalated over graphene oxide layers in a reactor vessel, heating the reactor vessel to a temperature between 25° C. and 200° C., and reducing sulfur content of the liquid fuel with a sulfur reduction amount of more than 95% wt. Reducing the sulfur content of the liquid fuel with the sulfur reduction amount of more than 95% wt. includes producing sulfone and sulfoxide compounds by oxidizing the liquid fuel with ozone gas in the presence of the quantum dot hybrid catalyst at the temperature between 25° C. and 200° C., and separating the sulfone and sulfoxide compounds from the liquid fuel by extracting the sulfone and sulfoxide with an extraction solvent.

19 Claims, 15 Drawing Sheets

(51) Int. Cl.
  *B01J 37/34* (2006.01)
  *B01J 37/00* (2006.01)
  *B01J 37/02* (2006.01)
  *B01J 27/043* (2006.01)
  *B01J 27/047* (2006.01)

(52) U.S. Cl.
  CPC ........... *B01J 27/051* (2013.01); *B01J 35/006* (2013.01); *B01J 35/0013* (2013.01); *B01J 37/009* (2013.01); *B01J 37/0213* (2013.01); *B01J 37/0236* (2013.01); *B01J 37/04* (2013.01); *B01J 37/343* (2013.01); *C10G 27/14* (2013.01); *C10G 2300/1051* (2013.01); *C10G 2300/1055* (2013.01); *C10G 2300/1074* (2013.01); *C10G 2300/202* (2013.01); *C10G 2300/207* (2013.01); *C10G 2300/70* (2013.01)

(56) References Cited

OTHER PUBLICATIONS

Dizaji, Azam Khodadadi et al., Complete oxidative desulfurization using graphene oxide-based phosphomolybdic acid catalyst: Process optimization by two phase mass balance approach, Chemical Engineering Journal, Oct. 2017, pp. 362-372.*

Ma, Sujuan et al., Carbon quantum dots/attapulgite nanocomposites with enhanced photocatalytic performance for desulfurization, Journal of Materials Science: Materials in Electronics, Nov. 2017, pp. 2709-2715.*

Feng Li et al., MoS2 quantum dots decorated RGO: A Designed Electrocatalysts with High Active Site Density for the Hydrogen Evolution Reaction, Journal of Materials Chemistry A, Sep. 2015, pp. 1-8.

Min Wang et al., Tuning size of MoS2 in MoS2/graphene oxide heterostructures for enhanced photocatalytic hydrogen evolution, J Mater Sci, Oct. 2017.

Deepesh Gopalakrishnan et al., MoS2 Quantum Dot-Interspersed Exfoliated MoS2 Nanosheets, ACS Nano, 2014, vol. 8, No. 5, pp. 5297-5303.

A. Bayat and E. Saievar-Iranizad, Synthesis of blue photoluminescent WS2 quantum dots via ultrasonic cavitation, Journal of Luminescence, 2017, vol. 185, pp. 236-240.

* cited by examiner

OXIDATIVE DESULFURIZATION OF LIQUID FUELS USING METAL SULFIDE QUANTUM DOTS/GRAPHEN OXID HYBRID NANOCATALYST

CROSS-REFERENCE TO RELATED APPLICATION

This application claims the benefit of priority from U.S. Provisional Patent Application Ser. No. 62/636,837 filed on Feb. 28, 2018, and entitled "METAL QUANTUM DOTS GRAPHEN OXID HYBRID NANOCATALYST FOR OXIDATION DESULFURIZATION OF HEAVY OILS HYDROCARBON", which is incorporated herein by reference in its entirety.

TECHNICAL FIELD

The present disclosure generally relates to oxidative desulfurization of liquid fuels, and particularly, to ultra-deep oxidative desulfurization of heavy liquid hydrocarbon fuels by ozone gas utilizing metal sulfide quantum dots intercalated over graphene oxide layers.

BACKGROUND

Hydrocarbon fuels contain sulfur compounds which form sulfur oxide during a combustion process and eventually lead to sever issues in environment and health of human. Also, higher concentrations of sulfur compounds results in acidic rains. Furthermore, when the concentration of sulfur in oil derivatives exceeds an allowable value, it leads to corrosion of metallic vessels, reactors, tubes and joints, and poisons the high-cost down-stream catalysts in addition to polluting the atmosphere. Considering the above-mentioned facts, desulfurizing the oil cuts is an essential process in hydrocarbon fuels processing.

Desulfurization of sulfur containing solutions is performed through Hydrodesulfurization (HDS) and nonhydrotreating desulfurization processes. The nonhydrotreating desulfurization processes include extractive, oxidative desulfurization (ODS), adsorption, biological desulfurization (BDS), etc. which are known to be complementary to HDS process. The catalytic oxidative desulfurization may be an appropriate alternative to HDS process, since this method is carried out in normal reaction conditions such as atmospheric pressure and low temperatures in which there is no need for hydrogen. However, catalytic oxidative desulfurization processes require one or more oxidizers such as organic peroxides, hydroperoxides, peroxide salts, nitrogen oxide, oxygen ($O_2$), hydrogen peroxide and tetra butyl hydrogen peroxide, etc., which decrease safety of the sweetening process due to their low stability and complicated conditions for their maintenance in reaction environment. Additionally, these oxidizers have a high cost making it not cost effective to conduct the catalytic oxidative desulfurization process.

The catalysts used in oxidative desulfurization process include heterogeneous and homogenous catalysts. In desulfurization processes which adopt homogenous catalysts, catalysts such as formic acid and acetic acid, etc. are utilized. However, the efficiency of the desulfurization in these processes is low and an adequate standard amount of safety is not provided. In the desulfurization processes using heterogeneous catalysts, a solid catalyst is utilized along with the oxidizer agent in which the active catalyst is supported over catalyst supports such as alumina, silica, etc. Alternatively, the solid catalyst is used solely. However, supporting the catalyst over catalyst supports involves low surface area, low pore volume, no-uniform distribution of the active catalyst, and possibly the agglomeration of the metallic particles; consequently, it is not an easy task to impregnate the catalyst support by high amount of metallic particles which is necessary for desulfurization of a fuel feedstock containing dibenzothiophene and alkyl dibenzothiophenes.

Hence, there is a need for an oxidative desulfurization process and catalyst which may overcome the high cost and low efficiency of common oxidative desulfurization procedures. Also, there is a need for an oxidative desulfurization process and catalyst to alleviate the reaction conditions (atmospheric pressure and low temperature) for oxidative desulfurization and also reduction of the consumption of catalyst while increasing sulfur reduction efficiency. Additionally, there is a need for utilizing a catalyst for oxidative desulfurization of fuels, which may not involve the agglomeration of catalyst and may facilitate the formation of active sites over the catalyst. Moreover, there is a need for a method for oxidative desulfurization that may utilize suitable and optimized process conditions.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for oxidative desulfurization of liquid hydrocarbon fuels. The method may include contacting a liquid fuel with a quantum dot hybrid catalyst in a reactor vessel, heating the reactor vessel to a temperature between 25° C. and 200° C., and reducing sulfur content of the liquid fuel with a sulfur reduction amount of more than 95% wt. The quantum dot hybrid catalyst may include metal sulfide quantum dots intercalated over graphene oxide layers. In an exemplary implementation, reducing the sulfur content of the liquid fuel with the sulfur reduction amount of more than 95% wt. may include producing sulfone and sulfoxide compounds by oxidizing the liquid fuel with ozone gas in the presence of the quantum dot hybrid catalyst at the temperature between 25° C. and 200° C., and separating the sulfone and sulfoxide compounds from the liquid fuel by extracting the sulfone and sulfoxide with an extraction solvent.

In an exemplary implementation, contacting the liquid fuel with the quantum dot hybrid catalyst in the reactor vessel may include adding the quantum dot hybrid catalyst to the reactor vessel containing the liquid fuel with a weight ratio of the quantum dot hybrid catalyst to the liquid fuel in a range between 1% wt. and 5% wt. In an exemplary implementation, contacting the liquid fuel with the quantum dot hybrid catalyst in the reactor vessel further may further include mixing the quantum dot hybrid catalyst and the liquid fuel in the reactor vessel with a mixing rate in a range between 200 rpm and 2000 rpm.

In an exemplary implementation, heating the reactor vessel to the temperature between 25° C. and 200° C. may include maintaining the reactor vessel at a temperature between 25° C. and 100° C.

In an exemplary implementation, producing the sulfone and sulfoxide compounds by oxidizing the liquid fuel with the ozone gas in the presence of the quantum dot hybrid catalyst at the temperature between 25° C. and 200° C. may include flowing the ozone gas into the reactor vessel while mixing the liquid fuel and the quantum dot hybrid catalyst in the reactor vessel at the temperature between 25° C. and 200° C. In an exemplary implementation, producing the sulfone and sulfoxide compounds by oxidizing the liquid fuel with the ozone gas in the presence of the quantum dot hybrid catalyst at the temperature between 25° C. and 200° C. may include flowing the ozone gas into the reactor vessel with a flow rate between 100 ml/min and 700 ml/min for a period of time between 1 hour and 12 hours.

In an exemplary implementation, separating the sulfone and sulfoxide compounds from the liquid fuel by extracting the sulfone and sulfoxide with the extraction solvent may include extracting the sulfone and sulfoxide compounds from the liquid fuel using at least one of methanol, water, acetonitrile, sulfolane, dimethylformamide (DMF), and combinations thereof.

In an exemplary embodiment, the liquid fuel may include a hydrocarbon fuel cut with a boiling temperature in a range between 38° C. and 750° C. In an exemplary embodiment, the liquid fuel may include at least one of naphtha, kerosene, diesel, gas oil, vacuum gas oil (VGO), mazot, atmospheric residue of petroleum, and combinations thereof. In an exemplary embodiment, the liquid fuel may include a hydrocarbon fuel cut with a sulfur content in a range between 50 ppm and 60000 ppm (6% wt.). In an exemplary embodiment, the liquid fuel may include a hydrocarbon fuel cut with a sulfur content in a range between 10000 ppm (1% wt.) and 60000 ppm (6% wt.).

In an exemplary embodiment, the metal sulfide quantum dots may include at least one of molybdenum disulfide quantum dots ($MoS_2$ QDs), chromium sulfide quantum dots ($Cr_2S_3$ QDs), tungsten disulfide quantum dots ($WS_2$ QDs), nickel sulfide quantum dots ($Ni_3S_2$ QDs), and combinations thereof. In an exemplary embodiment, the quantum dot hybrid catalyst may include the metal sulfide quantum dots with a size between 0.5 nm and 5 nm. In an exemplary embodiment, the quantum dot hybrid catalyst may include a weight ratio of the metal sulfide quantum dots to the graphene oxide in a range between 0.02% wt. and 0.1% wt.

In an exemplary implementation, the exemplary method for oxidative desulfurization of liquid hydrocarbon fuels may further include synthesizing the quantum dot hybrid catalyst. In an exemplary implementation, synthesizing the quantum dot hybrid catalyst may include synthesizing a suspension of the metal sulfide quantum dots, and intercalating the metal sulfide quantum dots between layers of graphene oxide.

In an exemplary implementation, synthesizing the metal sulfide quantum dots may include forming a suspension by dispersing metal sulfide particles in a mixture of an alcohol and a chelating agent at a temperature between 20° C. and 40° C., exfoliating the metal sulfide particles by sonicating the suspension with ultrasonic waves for a period of time between 10 minutes and 1 hour at a sonication power between 50 $W/cm^2$ and 300 $W/cm^2$, and forming the suspension of the metal sulfide quantum dots by separating a suspension of the exfoliated metal sulfide particles by centrifuging the sonicated suspension.

In an exemplary embodiment, the alcohol may include at least one of methanol, ethanol, propanol, and combinations thereof. In an exemplary embodiment, the chelating agent may include at least one of polyvinylpyrrolidone (PVP), sodium dodecyl sulfate (SDS), potassium laurate (K-LAURATE), and combinations thereof.

In an exemplary implementation, intercalating the metal sulfide quantum dots between layers of graphene oxide may include forming a metal sulfide/graphene oxide mixture by adding a solution of graphene oxide to the suspension of the metal sulfide quantum dots, stirring the metal sulfide/graphene oxide mixture for a time period between 15 minutes and 2 hours with a mixing rate between 200 rpm and 2000 rpm, and drying the stirred metal sulfide/graphene oxide mixture at a temperature between 50° C. and 200° C. for a period of time between 4 hours and 24 hours.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein, an exemplary method for oxidative desulfurization of liquid hydrocarbon fuels using an exemplary quantum dot hybrid catalyst is disclosed. Exemplary method may include oxidizing heavy hydrocarbon fuels by ozone gas at mild conditions (atmospheric pressure and low temperature) in the presence of exemplary quantum dot hybrid catalyst, which may include metal sulfide quantum dots that may be intercalated over graphene oxide layers. The exemplary method may be utilized for ultra-deep desulfurization of liquid hydrocarbon fuels by reducing sulfur contents of such fuels to less than about 10 ppm at mild conditions.

The presence of exemplary metal sulfide quantum dots over graphene oxide layers may provide a higher specific surface area, increased pore volume, and higher pore diameters in the structure of exemplary quantum dot hybrid catalyst as an exemplary oxidative desulfurization catalyst. Furthermore, exemplary quantum dot hybrid catalyst may be prepared through a simple synthesis procedure with no need to a calcination process. Regarding an exemplary catalyst formulations of the present disclosure, using exemplary metal sulfide quantum dots in size of about 0.5-2 nm over graphene oxide layers may prevent catalyst agglomeration and facilitate the formation of active sites over the exemplary catalyst. Also, high efficiency may be obtained for the prepared oxidative desulfurization catalysts at alleviated reaction conditions.

Figure 1A:
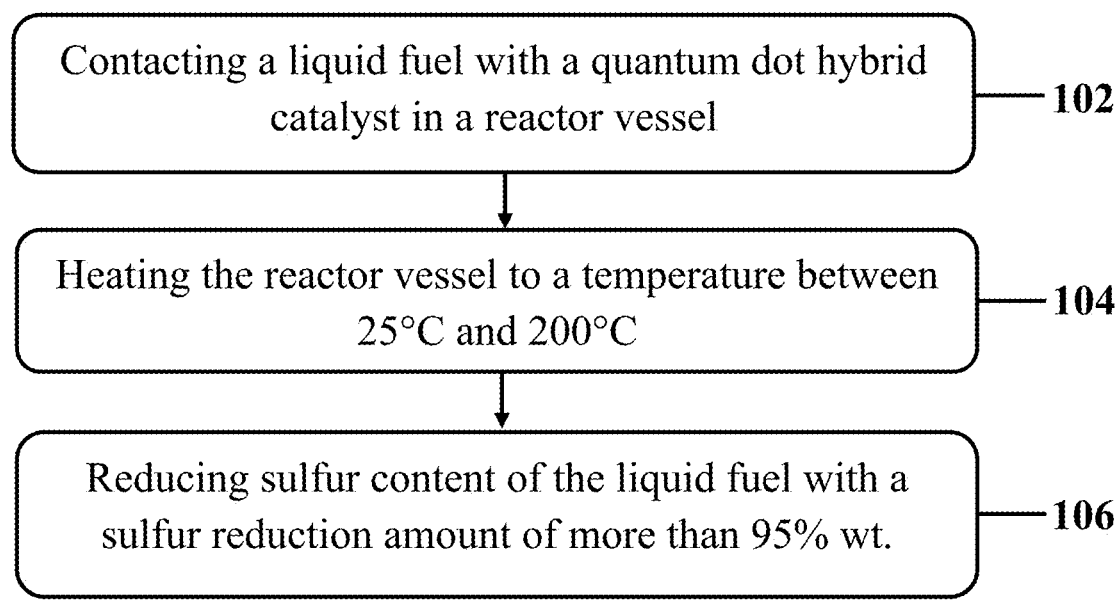
FIG. 1A illustrates an exemplary method for oxidative desulfurization of liquid hydrocarbon fuels, consistent with one or more exemplary embodiments of the present disclosure.

FIG. 1A shows an exemplary method 100 for oxidative desulfurization of liquid hydrocarbon fuels, consistent with one or more exemplary embodiments of the present disclosure. Exemplary method 100 may include contacting a liquid fuel with a quantum dot hybrid catalyst in a reactor vessel (step 102), heating the reactor vessel to a temperature between 25° C. and 200° C. (step 104), and reducing sulfur content of the liquid fuel with a sulfur reduction amount of more than 95% wt. (step 106). Where, the quantum dot hybrid catalyst may include metal sulfide quantum dots which may be intercalated over graphene oxide layers.

Figure 2:
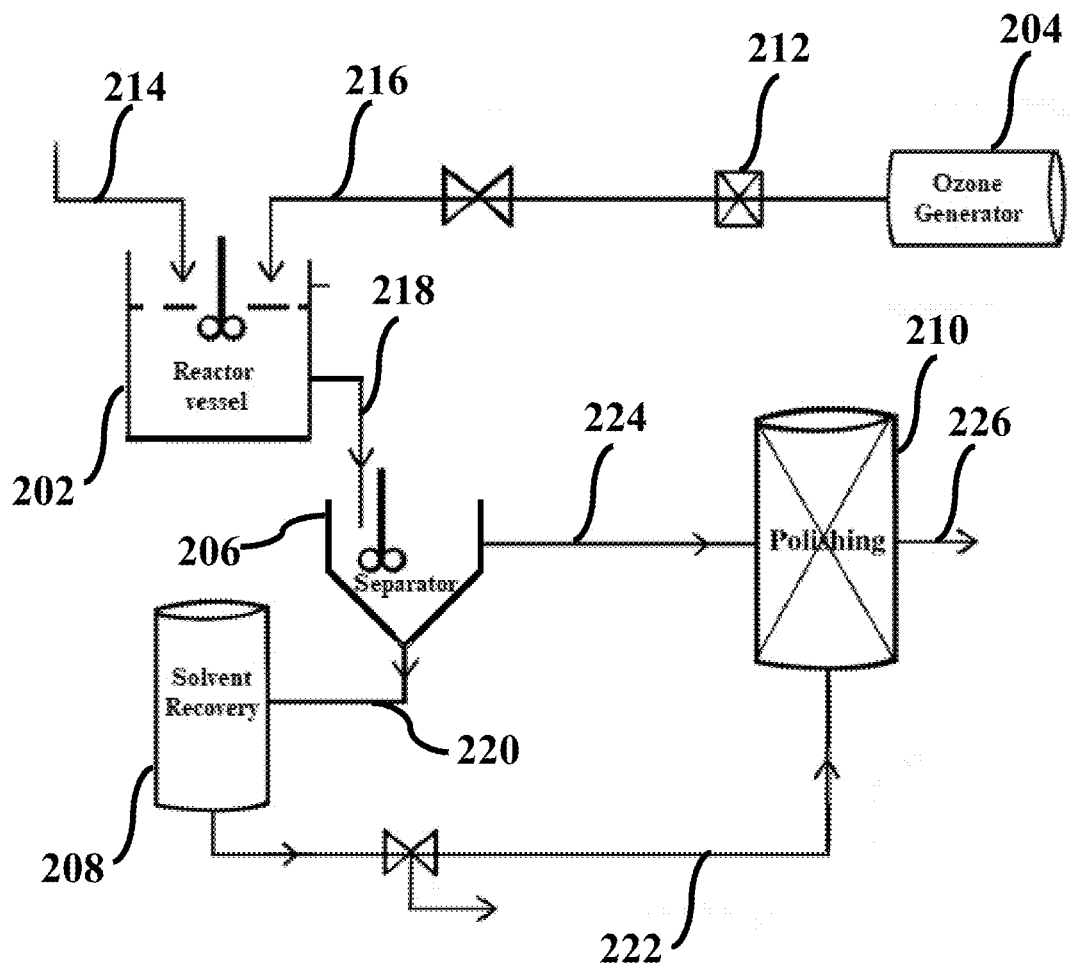
FIG. 2 illustrates a schematic flow diagram of an exemplary implementation of an exemplary setup for oxidative desulfurization of liquid hydrocarbon fuels, consistent with one or more exemplary embodiments of the present disclosure.

In an exemplary implementation, an exemplary setup may be utilized to perform exemplary method 100 for oxidative desulfurization of liquid hydrocarbon fuels. FIG. 2 shows a schematic flow diagram of an exemplary implementation of an exemplary setup 200 for oxidative desulfurization of liquid hydrocarbon fuels, consistent with one or more exemplary embodiments of the present disclosure. In an exemplary embodiment, exemplary setup 200 may include an oxidative reactor 202, an ozone generator 204, a separator 206, a solvent recovery unit 208, and a polishing unit 210. In an exemplary embodiment, exemplary setup 200 may further include mass flow controller (MFC) 212 that may be configured to adjust ozone flow rate in a rage between about 100 cc/min and about 1000 cc/min by measuring and controlling the ozone flow rate.

Referring to FIG. 1A, step 102 may include contacting a liquid fuel with a quantum dot hybrid catalyst in a reactor vessel. In an exemplary implementation with reference to FIG. 2, contacting the liquid fuel with the quantum dot hybrid catalyst in the reactor vessel may include adding the quantum dot hybrid catalyst via line 214 to exemplary reactor vessel 202 that may contain the liquid fuel. The quantum dot hybrid catalyst may be added to exemplary reactor vessel 202 containing the liquid fuel with a weight ratio of the quantum dot hybrid catalyst to the liquid fuel in a range between about 1% wt. and about 5% wt. In an exemplary implementation, contacting the liquid fuel with the quantum dot hybrid catalyst in exemplary reactor vessel 202 may further include mixing the quantum dot hybrid catalyst and the liquid fuel in exemplary reactor vessel 202 with a mixing rate in a range between about 200 rpm and about 2000 rpm.

In an exemplary embodiment, exemplary reactor vessel 202 may include a batch reactor vessel or a continuous reactor vessel. In an exemplary embodiment, exemplary reactor vessel 202 may include a glass reactor vessel or a steel reactor vessel. In an exemplary embodiment, exemplary reactor vessel 202 may be equipped with a stirrer or an agitator.

In an exemplary embodiment, the liquid fuel may include a hydrocarbon fuel cut with a boiling temperature in a range between about 38° C. and about 750° C. In an exemplary embodiment, the liquid fuel may include at least one of naphtha, kerosene, diesel, gas oil, vacuum gas oil (VGO), mazot, atmospheric residue of petroleum, and combinations thereof. In an exemplary embodiment, the liquid fuel may include a hydrocarbon fuel cut with a sulfur content in a range between about 50 ppm and about 60000 ppm (6% wt.). In an exemplary embodiment, the liquid fuel may include a hydrocarbon fuel cut with a sulfur content in a range between about 10000 ppm (1% wt.) and about 60000 ppm (6% wt.). In an exemplary embodiment, the liquid fuel may include at least one of naphtha with a sulfur content of about 1000 ppm to about 3000 ppm, kerosene with a sulfur content of about 1500 ppm to about 3000 ppm, diesel with a sulfur content of about 10000 ppm to about 15000 ppm, gas oil with a sulfur content of about 10000 ppm to about 15000 ppm, vacuum gas oil (VGO) with a sulfur content of about 16000 ppm to about 35000 ppm, mazot with a sulfur content of about 28000 ppm to about 40000 ppm, atmospheric residue of petroleum with a sulfur content of about 37000 ppm to about 60000 ppm, and combinations thereof.

In an exemplary embodiment, the metal sulfide quantum dots may include at least one of molybdenum disulfide quantum dots ($MoS_2$ QDs), chromium sulfide quantum dots ($Cr_2S_3$ QDs), tungsten disulfide quantum dots ($WS_2$ QDs), nickel sulfide quantum dots ($Ni_3S_2$ QDs), and combinations thereof. In an exemplary embodiment, the metal sulfide quantum dots may include metal sulfide quantum dots of the sixth group (group VIB) of the periodic table, for example, at least one of $MoS_2$ QDs, $Cr_2S_3$ QDs, $WS_2$ QDs, and combinations thereof.

In an exemplary embodiment, the quantum dot hybrid catalyst may include a layered structure that may include the metal sulfide quantum dots with a size between about 0.5 nm and about 5 nm supported over graphene oxide (GO) layers. In an exemplary embodiment, the metal sulfide quantum dots may include quantum dots with a size between about 0.5 nm and about 2 nm.

In an exemplary embodiment, the quantum dot hybrid catalyst may include a weight ratio of the metal sulfide quantum dots to the graphene oxide (GO) in a range between about 0.02% wt. and about 0.1% wt. The metal sulfide quantum dots may be intercalated between GO layers in such a way that the metal sulfide quantum dots may be uniformly dispersed and attached on structural defects of the GO layers.

In an exemplary embodiment, the quantum dot hybrid catalyst may include about 0.05 gr to about 0.1 gr of the metal sulfide quantum dots and the graphene oxide with a concentration range of about 0.5-5 mg/mL. Furthermore, in an exemplary embodiment, the quantum dot hybrid catalyst may contain the graphene oxide in % vol. range of about 10-40%.

Additionally, referring again to FIG. 1A and FIG. 2, step 104 may include heating exemplary reactor vessel 202 to a temperature between about 25° C. and about 200° C. In an exemplary implementation, heating exemplary reactor vessel 202 to the temperature between about 25° C. and about 200° C. may include heating exemplary reactor vessel 202 to a temperature between about 25° C. and about 100° C., and maintaining exemplary reactor vessel 202 at the temperature between about 25° C. and about 100° C. So, the oxidative desulfurization of the liquid hydrocarbon fuels may be carried out at a temperature of less than about 200° C., and specifically, less than about 100° C.

In an exemplary implementation, pressure of exemplary reactor vessel 202 may be maintained at atmospheric pressure (ambient pressure) during applying steps 102, 104, and 106. So, the oxidative desulfurization of the liquid hydrocarbon fuels may be carried out at atmospheric pressure. Furthermore, the oxidative desulfurization of the liquid hydrocarbon fuels may be carried out at mild conditions, including atmospheric pressure and low temperatures of less than about 100° C.

Figure 1B:
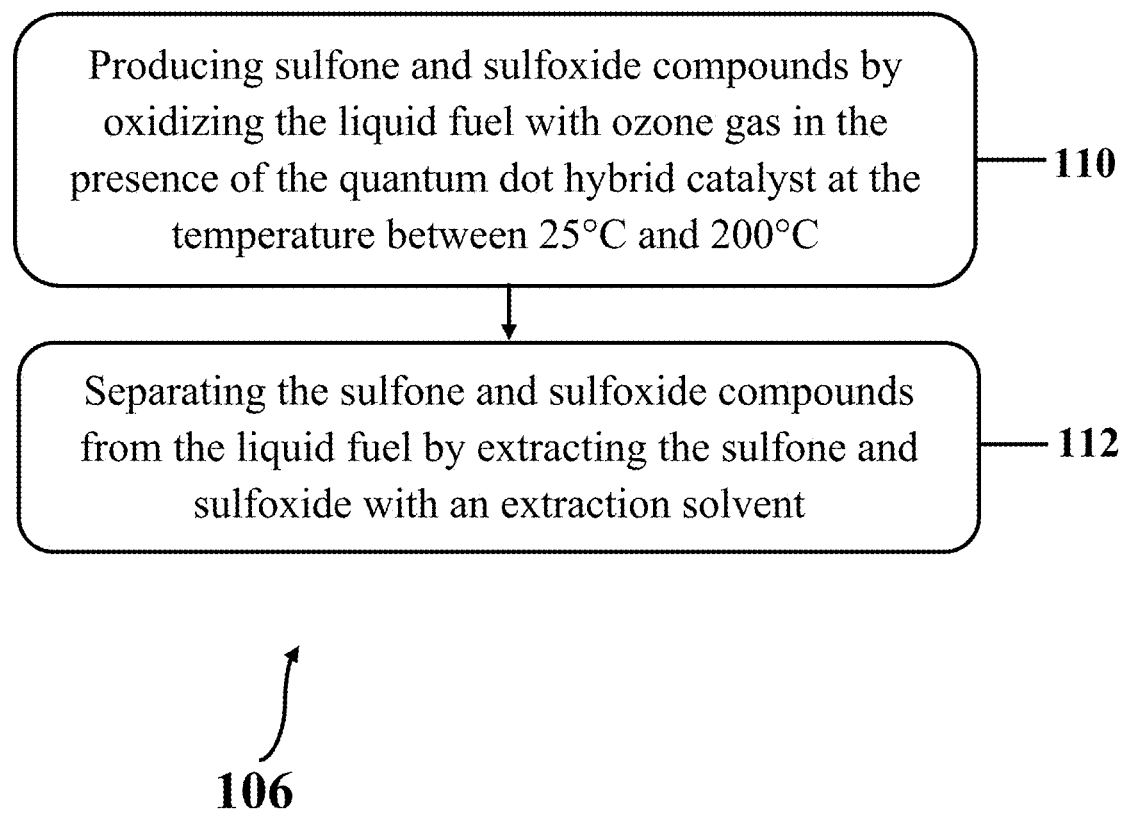
FIG. 1B illustrates an exemplary implementation of an exemplary process for reducing the sulfur content of the liquid fuel with the sulfur reduction amount of more than about 95% wt., consistent with one or more exemplary embodiments of the present disclosure.

Furthermore, referring more to FIG. 1A, step 106 may include reducing sulfur content of the liquid fuel with a sulfur reduction amount of more than about 95% wt. FIG. 1B shows an exemplary implementation of an exemplary process for reducing the sulfur content of the liquid fuel with the sulfur reduction amount of more than about 95% wt. (step 106), consistent with one or more exemplary embodiments of the present disclosure. In an exemplary implementation, reducing the sulfur content of the liquid fuel with the sulfur reduction amount of more than about 95% wt. (step 106) may include producing sulfone and sulfoxide compounds by oxidizing the liquid fuel with ozone gas in the presence of the quantum dot hybrid catalyst at the temperature between about 25° C. and about 200° C. (step 110) and separating the sulfone and sulfoxide compounds from the liquid fuel by extracting the sulfone and sulfoxide with an extraction solvent (step 112).

In an exemplary implementation, producing the sulfone and sulfoxide compounds by oxidizing the liquid fuel with the ozone gas in the presence of the quantum dot hybrid catalyst at the temperature between about 25° C. and about 200° C. (step 110) may include flowing the ozone gas into exemplary reactor vessel 202 while mixing the liquid fuel and the quantum dot hybrid catalyst in exemplary reactor vessel 202 at a temperature between about 25° C. and about 200° C.; thereby, forming the sulfone and sulfoxide compounds responsive to oxidation of the liquid fuel by the ozone gas in the presence of the quantum dot hybrid catalyst. In an exemplary implementation, referring to FIG. 2, the ozone gas may be generated by exemplary ozone generator 204 and the generated ozone gas may be introduced into exemplary reactor vessel 202 via line 216. In an exemplary implementation, producing the sulfone and sulfoxide compounds by oxidizing the liquid fuel with the ozone gas in the presence of the quantum dot hybrid catalyst at the temperature between about 25° C. and about 200° C. may include flowing the ozone gas into exemplary reactor vessel 202 with a flow rate between about 100 ml/min and about 700 ml/min for a period of time between about 1 hour and about 12 hours.

Moreover, separating the sulfone and sulfoxide compounds from the liquid fuel by extracting the sulfone and sulfoxide with an extraction solvent (step 112) may include extracting the sulfone and sulfoxide compounds from the liquid fuel by a liquid extraction solvent that may include at least one of methanol, water, acetonitrile, sulfolane, dimethylformamide (DMF), and combinations thereof.

In an exemplary implementation with further reference to FIG. 2, separating the sulfone and sulfoxide compounds from the liquid fuel by extracting the sulfone and sulfoxide compounds with an extraction solvent (step 112) may include discharging the oxidized liquid fuel containing the sulfone and sulfoxide compounds from exemplary reactor vessel 202 and entering the oxidized liquid fuel into exemplary separator 206 via line 218, and mixing the oxidized liquid fuel with the liquid extraction solvent in exemplary separator 206. So, the sulfone and sulfoxide compounds may be extracted by the liquid extraction solvent in exemplary separator 206.

In an exemplary implementation, extracting the sulfone and sulfoxide compounds with the extraction solvent (step 112) may be carried out once or repeated iteratively. For iterative extraction, the extraction solvent containing the separated sulfone and sulfoxide compounds from the liquid fuel may be entered into exemplary solvent recovery unit 208 via line 220. The extraction solvent may be recovered in exemplary solvent recovery unit 208 by separating or stripping the sulfone and sulfoxide compounds from the extraction solvent. The recovered extraction solvent may be introduced into exemplary polishing unit 210 via line 222 and the separated liquid fuel from the sulfone and sulfoxide compounds may be introduced into exemplary polishing unit 210 via line 224, where the recovered extraction solvent and the separated liquid fuel may be mixed more to obtain a deep desulfurized liquid fuel that may exit from exemplary polishing unit 210 via line 226.

In an exemplary embodiment, the obtained deep desulfurized liquid fuel may include the liquid fuel with a reduced sulfur content by an amount of sulfur reduction of more than about 85%. In another exemplary embodiment, the obtained deep desulfurized liquid fuel may include liquid fuel with a reduced sulfur content by an amount of sulfur reduction of more than about 95%. In further exemplary embodiments, the obtained deep desulfurized liquid fuel may include liquid fuel with a reduced sulfur content by an amount of sulfur reduction of about 100%.

Figure 1C:
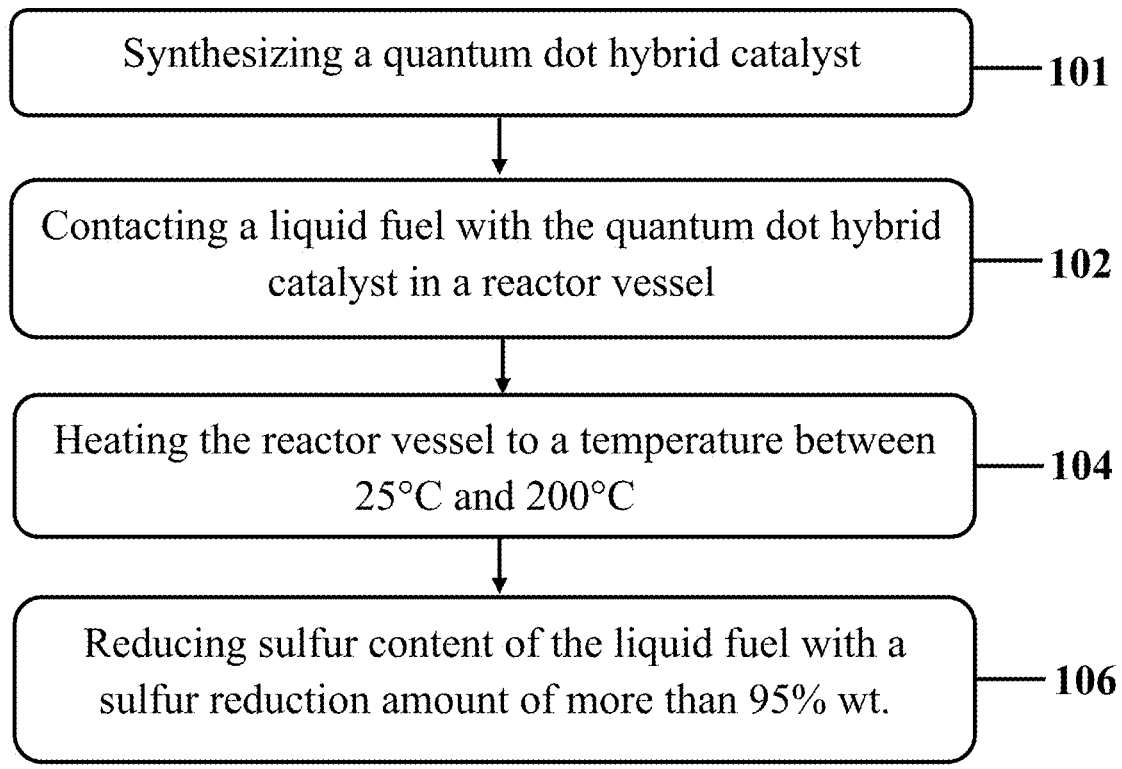
FIG. 1C illustrates another implementation of an exemplary method for oxidative desulfurization of liquid hydrocarbon fuels, consistent with one or more exemplary embodiments of the present disclosure.

In an exemplary implementation, exemplary method 100 may further include synthesizing the quantum dot hybrid catalyst. FIG. 1C shows an implementation of exemplary method 120 for oxidative desulfurization of liquid hydrocarbon fuels which includes method 100, consistent with one or more exemplary embodiments of the present disclosure. Accordingly, exemplary method 120 may further include synthesizing the quantum dot hybrid catalyst (step 101) that may be carried out before steps 102, 104, and 106.

Figure 1D:
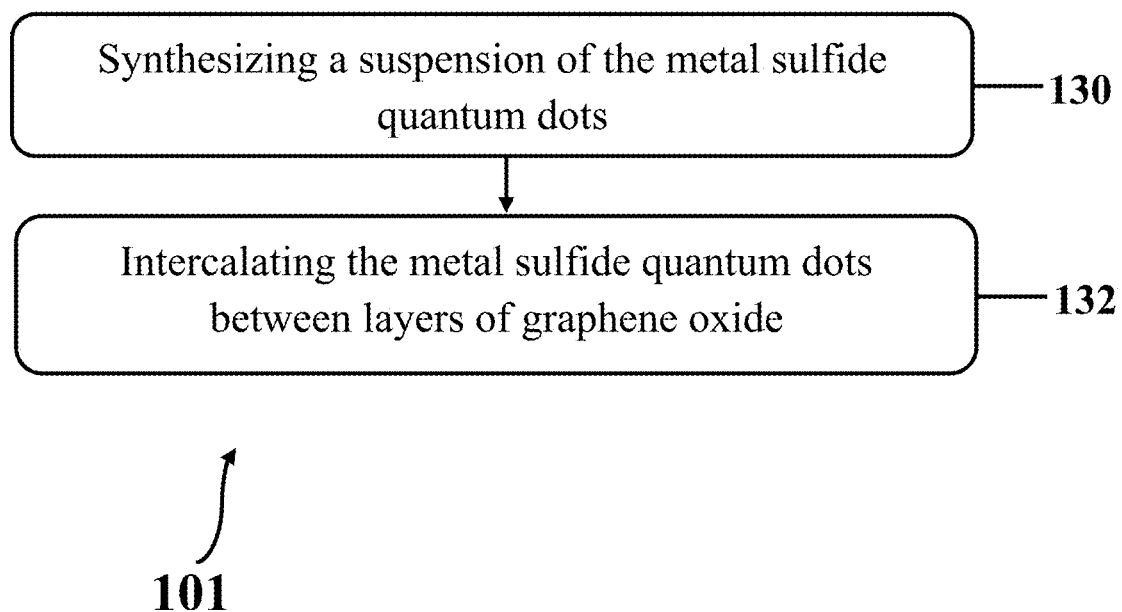
FIG. 1D illustrates an exemplary method for synthesizing the quantum dot hybrid catalyst, consistent with one or more exemplary embodiments of the present disclosure.

FIG. 1D shows an exemplary method for synthesizing the quantum dot hybrid catalyst (step 101), consistent with one or more exemplary embodiments of the present disclosure. Specifically, FIG. 1D provides the details for step 101 of FIG. 1C. Accordingly, synthesizing the quantum dot hybrid catalyst may include synthesizing a suspension of the metal sulfide quantum dots (step 130), and intercalating the metal sulfide quantum dots between layers of graphene oxide (step 132).

In detail, according to an exemplary implementation, synthesizing the suspension of the metal sulfide quantum dots (step 130) may include synthesizing the metal sulfide quantum dots through an up-down procedure. Macromolecules of a metal sulfide may be converted to quantum dots by reducing size of the metal sulfide through exfoliation of the metal sulfide. Exfoliation of the metal sulfide may include separating nanosheets of the metal sulfide using a polar solvent, for example, an alcohol.

In an exemplary implementation, synthesizing the suspension of the metal sulfide quantum dots (step 130) may include forming a suspension by dispersing metal sulfide particles in a mixture of an alcohol and a chelating agent at a temperature between about 20° C. and about 40° C., exfoliating the metal sulfide particles by sonicating the suspension with ultrasonic waves for a period of time between about 10 minutes and about 1 hour at a sonication power between about 50 W/cm$^2$ and about 300 W/cm$^2$, and forming the suspension of the metal sulfide quantum dots by separating a suspension of the exfoliated metal sulfide particles by centrifuging the sonicated suspension.

In an exemplary embodiment, the alcohol may include at least one of methanol, ethanol, propanol, and combinations thereof. In an exemplary embodiment, the chelating agent may include at least one of polyvinylpyrrolidone (PVP), sodium dodecyl sulfate (SDS), potassium laurate (K-LAURATE), and combinations thereof.

Additionally, intercalating the metal sulfide quantum dots between layers of graphene oxide (step 132) may include forming a metal sulfide/graphene oxide mixture by adding a solution of graphene oxide to the suspension of the metal sulfide quantum dots, stirring the metal sulfide/graphene oxide mixture for a time period between about 15 minutes and about 2 hours with a mixing rate between about 200 rpm and about 2000 rpm, and drying the stirred metal sulfide/graphene oxide mixture at a temperature between about 50° C. and about 200° C. for a period of time between about 4 hours and about 24 hours.

In an exemplary implementation, drying the stirred metal sulfide/graphene oxide mixture at the temperature between about 50° C. and about 200° C. for the period of time between about 4 hours and about 24 hours may include drying the stirred metal sulfide/graphene oxide mixture at a temperature between about 50° C. and about 120° C. for a period of time between about 4 hours and about 15 hours. In an exemplary implementation, drying the stirred metal sulfide/graphene oxide mixture at the temperature between about 50° C. and about 200° C. may include drying the stirred metal sulfide/graphene oxide mixture at a temperature of about 120° C. In an exemplary embodiment, drying the stirred metal sulfide/graphene oxide mixture may be carried out in a rotary drier.

Example 1: Synthesis of Quantum Dot Hybrid Catalyst

In this example, an exemplary quantum dot hybrid catalyst was synthesized according to exemplary process of step 102 described hereinabove. Exemplary synthesized quantum dot hybrid catalyst may include molybdenum sulfide quantum dots intercalated over graphene oxide layers with a chemical formula of $MoS_2$ QDs/GO.

In exemplary synthesis process, about 0.05 gr of molybdenum sulfide ($MoS_2$) was dissolved in about 10 mL of ethanol solvent containing polyvinylpyrrolidone (PVP) and placed under ultrasonic for about 1 hour to obtain a suspension. Then, the obtaining suspension was kept in ambient condition so that the $MoS_2$ particles that were not completely dispersed were separated and precipitated. Afterwards, the suspension was centrifuged at about 9000 rpm for about 20 minutes. After that, the suspension was separated as a clear solution in which the quantum dot molybdenum sulfides (exfoliated molybdenum sulfide particles) were dispersed. The resulting solution may have high stability in ambient conditions. Furthermore, about 1 mL of an aqueous solution of graphene oxide (GO) with about 3 mg GO/mL was added to the solution containing the exfoliated molybdenum sulfides and was mixed for about 30 minutes. The obtained mixture was dried at about 60° C. for about 6 hours.

Figure 3:
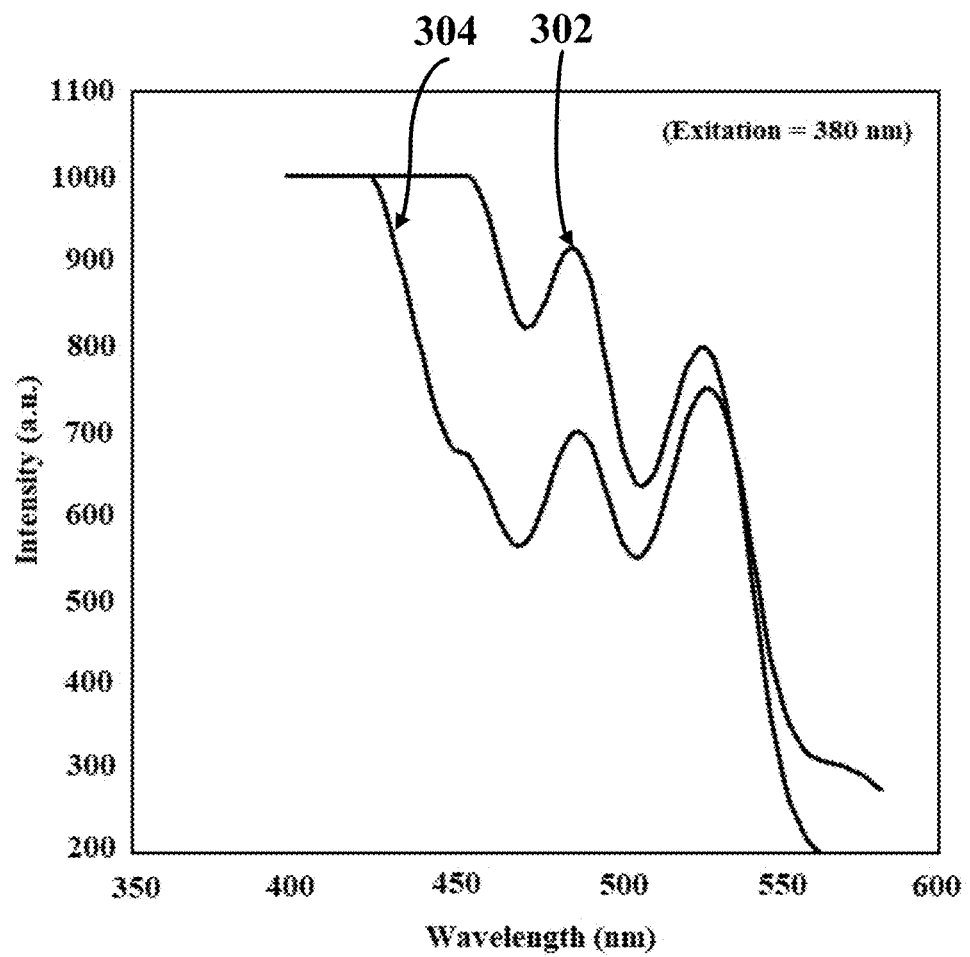
FIG. 3 illustrates a comparative chart of the fluorescent spectra intensity for exemplary $MoS_2$ quantum dots and an exemplary synthesized $MoS_2$ QDs/GO catalyst, consistent with one or more exemplary embodiments of the present disclosure.

For comparing characteristics of the synthesized MoS$_2$ QDs/GO catalyst with MoS$_2$ quantum dots, a number of characterization analyses were carried out. FIG. 3 shows a comparative chart of the fluorescent spectra intensity for exemplary MoS$_2$ quantum dots (curve 302) and exemplary synthesized MoS$_2$ QDs/GO catalyst (curve 304), consistent with one or more exemplary embodiments of the present disclosure. The fluorescent spectra 302 of exemplary MoS$_2$ quantum dots has two peaks at 490 nm and 528 nm, whereas the fluorescent spectra 304 of exemplary synthesized MoS$_2$ QDs/GO catalyst shows less intensity in the fluorescent spectra.

Figure 4A:
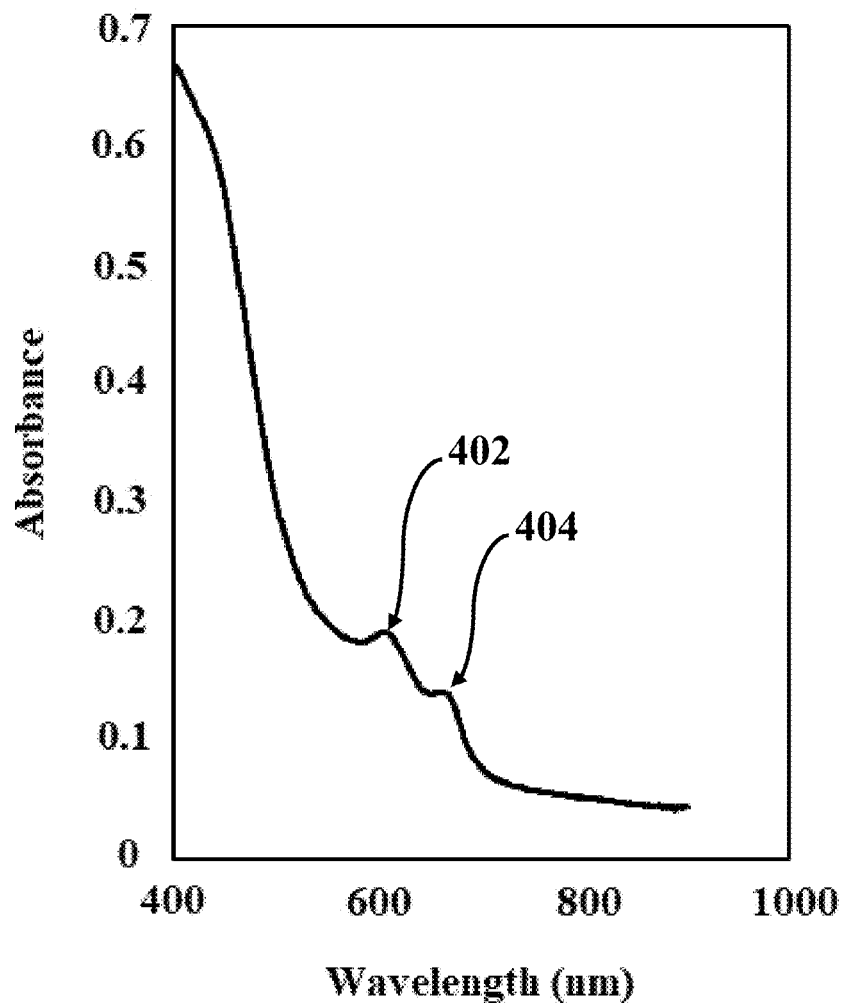
FIG. 4A illustrates UV/Vis spectra of exemplary $MoS_2$ quantum dots, consistent with one or more exemplary embodiments of the present disclosure.
Figure 4B:
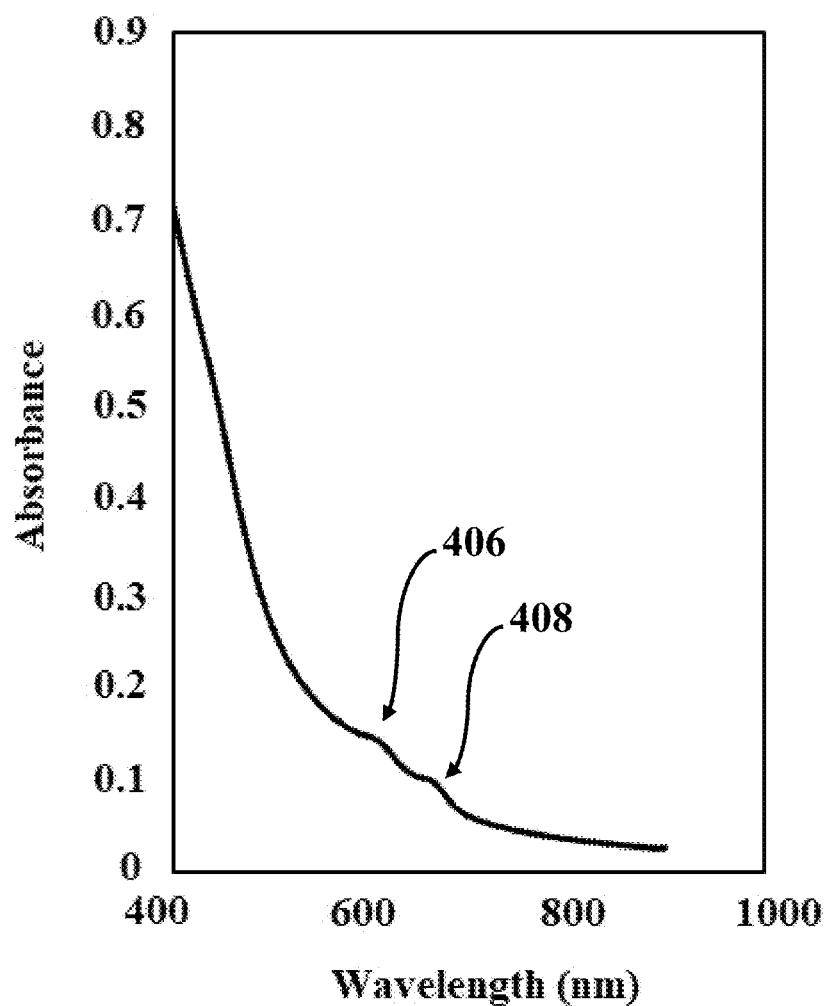
FIG. 4B illustrates UV/Vis spectra of exemplary synthesized $MoS_2$ QDs/GO catalyst, consistent with one or more exemplary embodiments of the present disclosure.

FIG. 4A shows UV/Vis spectra of exemplary MoS$_2$ quantum dots, consistent with one or more exemplary embodiments of the present disclosure. Moreover, FIG. 4B shows UV/Vis spectra of exemplary synthesized MoS$_2$ QDs/GO catalyst, consistent with one or more exemplary embodiments of the present disclosure. It may be observed from FIGS. 4A and 4B that two absorbance peaks are obtained at the same wavelengths for both MoS$_2$ quantum dots and exemplary synthesized MoS$_2$ QDs/GO catalyst. Peaks 402 and 406 occurred at wavelength 612 nm for both MoS$_2$ quantum dots and exemplary synthesized MoS$_2$ QDs/GO catalyst, and peaks 404 and 408 occurred at wavelength 673 nm for both MoS$_2$ quantum dots and exemplary synthesized MoS$_2$ QDs/GO catalyst. Peaks 402 and 404 may represent exfoliation of MoS$_2$ structure. Additionally, a lower intensity of peaks 406 and 408 in comparison with corresponding peaks 402 and 404 may be an indicator of hybridizing MoS$_2$ into GO structure.

Figure 5A:
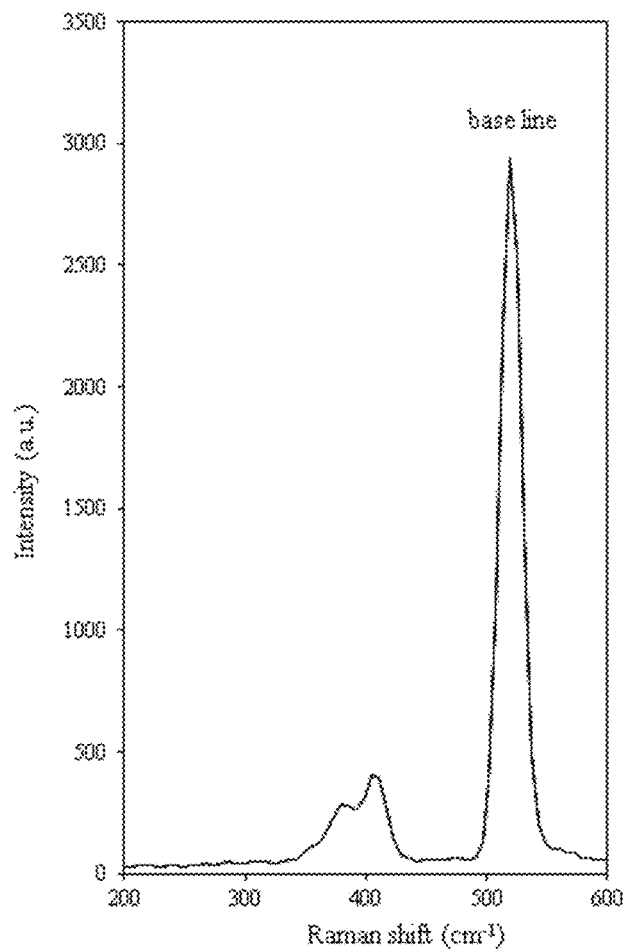
FIG. 5A illustrates Raman spectra of exemplary $MoS_2$ quantum dots, consistent with one or more exemplary embodiments of the present disclosure.
Figure 5B:
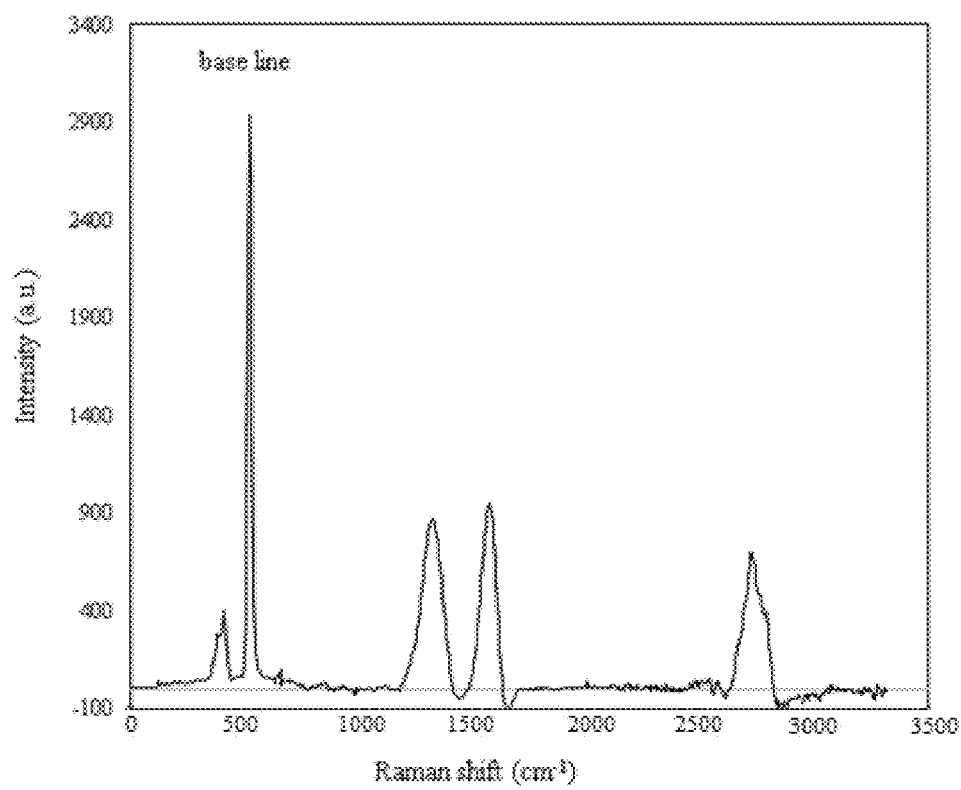
FIG. 5B illustrates Raman spectra of an exemplary synthesized $MoS_2$ QDs/GO catalyst, consistent with one or more exemplary embodiments of the present disclosure.

FIG. 5A shows Raman spectra of exemplary MoS$_2$ quantum dots, consistent with one or more exemplary embodiments of the present disclosure. FIG. 5B shows Raman spectra of exemplary synthesized MoS$_2$ QDs/GO catalyst, consistent with one or more exemplary embodiments of the present disclosure. The peaks of the Raman spectra in FIGS. 5A and 5B shows the formation of exemplary MoS$_2$ quantum dots and exemplary synthesized MoS$_2$ QDs/GO catalyst, respectively. The peaks at 382 nm and 407 nm are associated to MoS$_2$ nanostructures (QDs), and the peaks at 1340 nm, 1600 nm, and 2600 nm are associated to GO. The peak at 1340 nm ($I_D$) is associated to Dbond which represents the structural defects of GO structure. The peak at 1600 nm ($I_G$) is associated to Gbond which represents the graphite structure of GO. Higher values of $I_D/I_G$ represents more structural defects and functional groups in GO structure. The peak at 2600 nm is associated to 2D or G*, which is a G-complementary structure. Higher values of $I2_D/I_G$ represents less layers or sheets in GO structure which shows 2-3 layers of GO herein.

Figure 6:
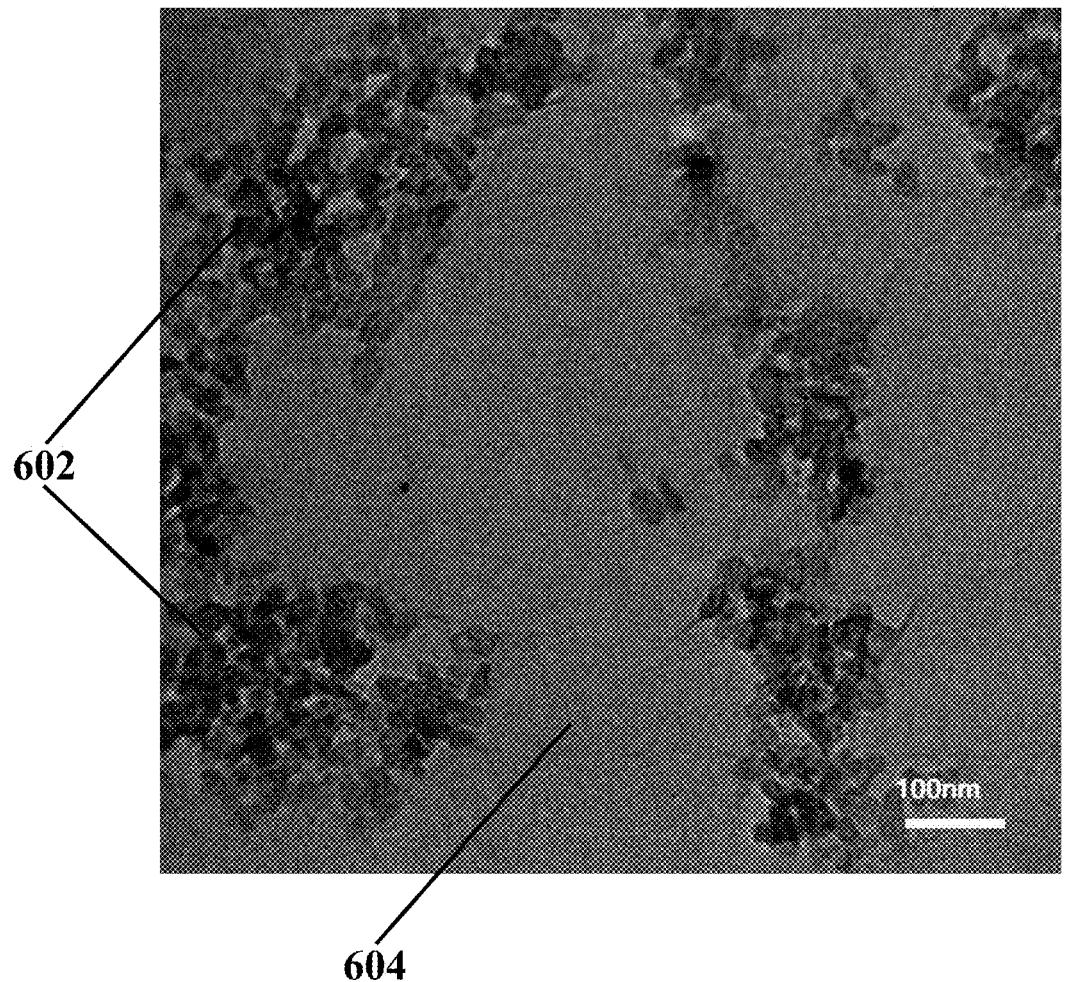
FIG. 6 illustrates a transmission electron microscopy (TEM) image of an exemplary synthesized $MoS_2$ QDs/GO catalyst, consistent with one or more exemplary embodiments of the present disclosure.

FIG. 6 shows a transmission electron microscopy (TEM) image of exemplary synthesized MoS$_2$ QDs/GO catalyst, consistent with one or more exemplary embodiments of the present disclosure. It may be seen that MoS$_2$ quantum dots 602 with a size of less than about 5 nm are intercalated between GO layers 604, so that MoS$_2$ quantum dots 602 are dispersed on the GO surface at the structural defects of GO layers 604.

Figure 7A:
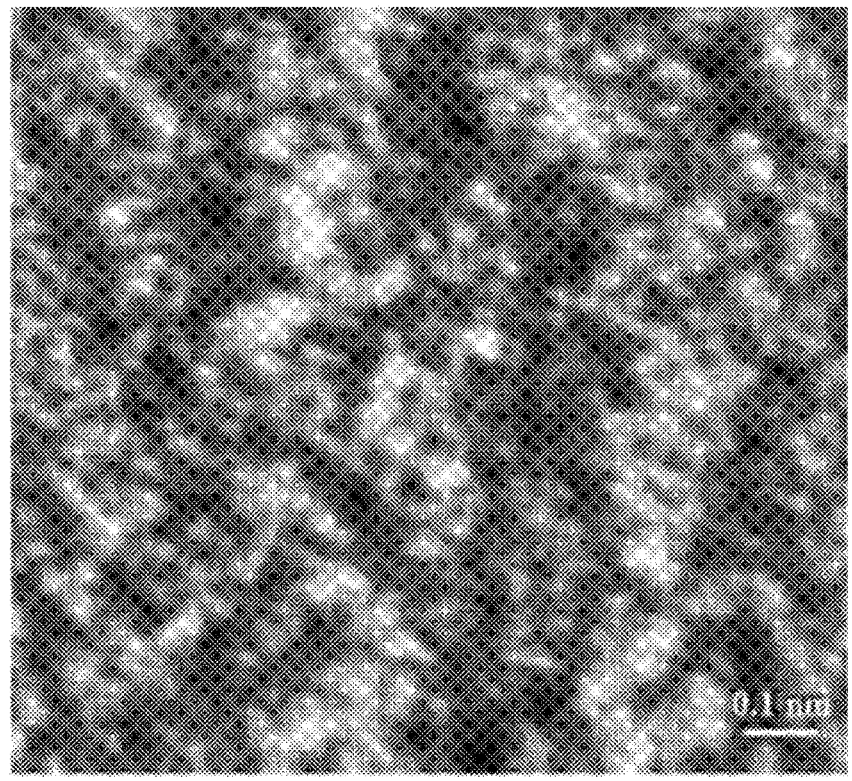
FIG. 7A illustrates an atomic force microscopy (AFM) image representing the morphology of exemplary $MoS_2$ quantum dots, consistent with one or more exemplary embodiments of the present disclosure.
Figure 7B:
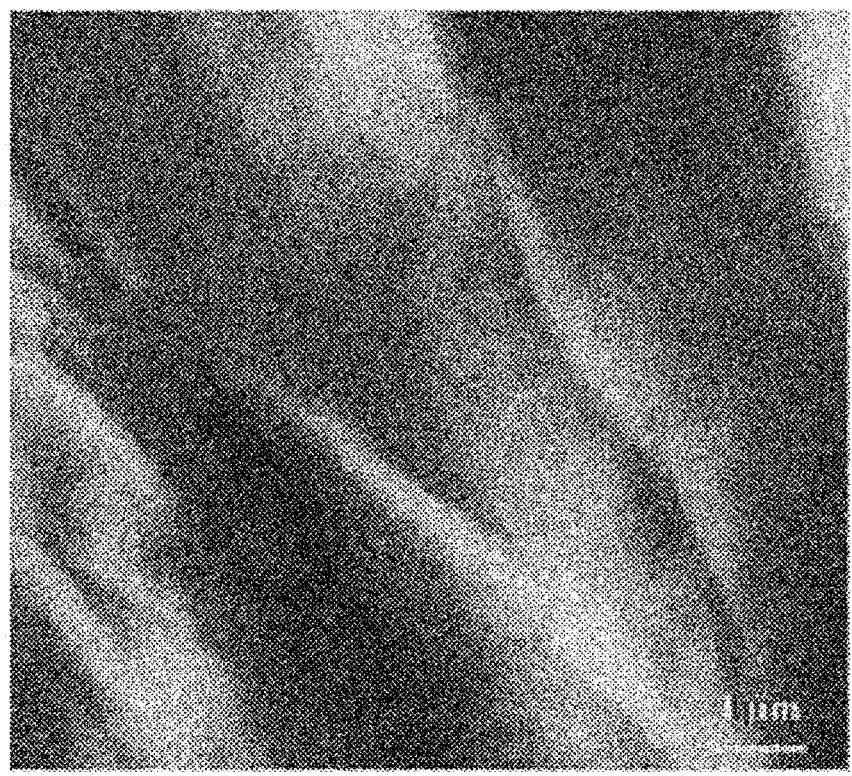
FIG. 7B illustrates an AFM image representing the morphology of exemplary graphene oxide (GO), consistent with one or more exemplary embodiments of the present disclosure.
Figure 7C:
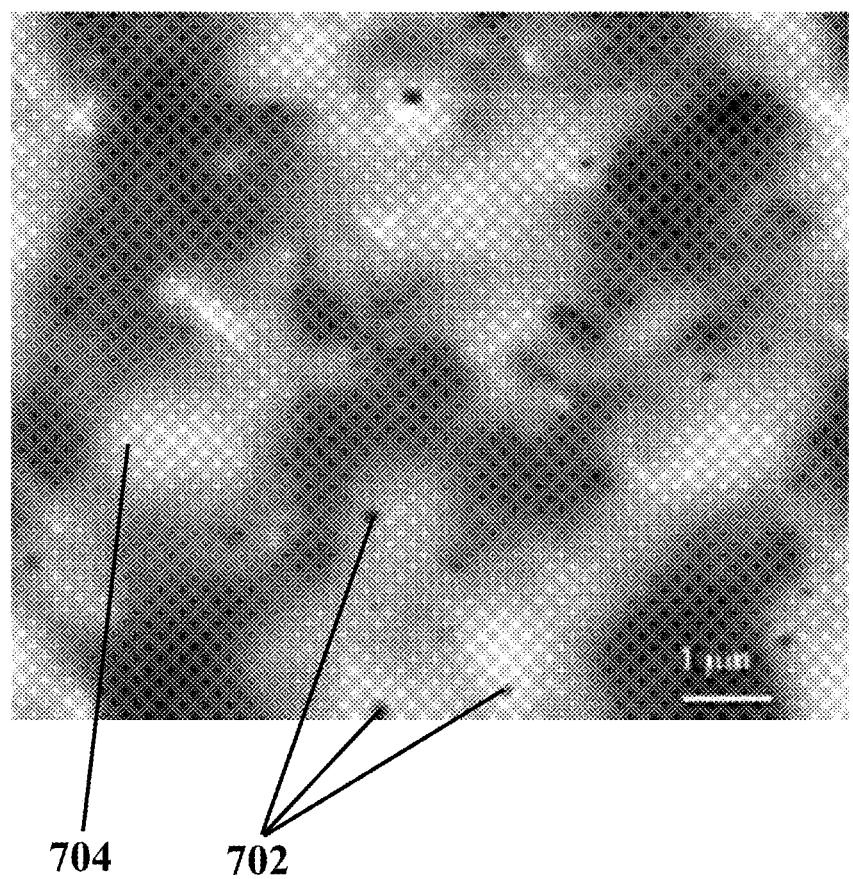
FIG. 7C illustrates an AFM image representing the morphology of an exemplary synthesized $MoS_2$ QDs/GO catalyst, consistent with one or more exemplary embodiments of the present disclosure.

For more clarification of how MoS$_2$ quantum dots are intercalated between GO layers and structural analysis of exemplary synthesized MoS$_2$ QDs/GO catalyst, comparative atomic force microscopy (AFM) analysis was carried out for exemplary MoS$_2$ quantum dots, exemplary GO, and also, for exemplary synthesized MoS$_2$ QDs/GO catalyst. FIG. 7A shows an AFM image representing the morphology of exemplary MoS$_2$ quantum dots, consistent with one or more exemplary embodiments of the present disclosure. FIG. 7B shows an AFM image representing the morphology of exemplary GO, consistent with one or more exemplary embodiments of the present disclosure. Moreover, FIG. 7C shows an AFM image representing the morphology of exemplary synthesized MoS$_2$ QDs/GO catalyst, consistent with one or more exemplary embodiments of the present disclosure. It may be seen that exemplary MoS$_2$ quantum dots 702 are uniformly dispersed on exemplary GO layers 704.

Figure 8:
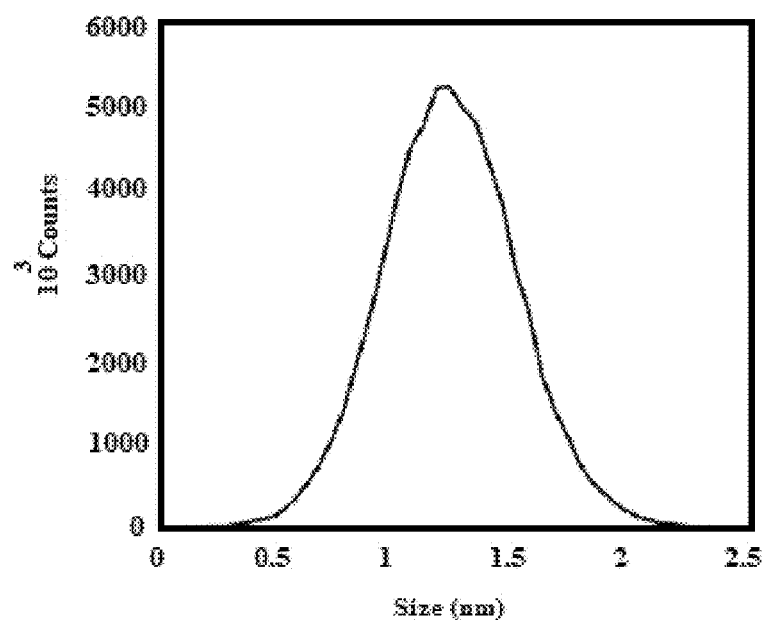
FIG. 8 illustrates nanoparticle size distribution of exemplary synthesized $MoS_2$ quantum dots, consistent with one or more exemplary embodiments of the present disclosure.

To obtain an accurate size distribution of exemplary synthesized MoS$_2$ quantum dots that were intercalated between GO layers, their size distribution was obtained from three-dimension AFM images. FIG. 8 shows nanoparticle size distribution of exemplary synthesized MoS$_2$ quantum dots, consistent with one or more exemplary embodiments of the present disclosure. It may be seen that exemplary MoS$_2$ quantum dots have a size of less than about 2.5 nm with an average size of about 1.25 nm.

Example 2: Oxidative Desulfurization of VGO in the Presence of Molybdenum Sulfide (MoS$_2$) (Macro) at 25° C.

An exemplary oxidative desulfurization reaction was performed in a batch reactor equipped with a stirrer. About 20 gr of the VGO feedstock containing about 16800 ppm sulfur (other specifications of the feedstock are presented in Table 1 herein below) was placed in the reactor and about 3% wt. of MoS$_2$ (macro) was added to reactor. Ozone gas was introduced into the reactor with a flow rate of about 400 ml/min at about 25° C. for about 8 hours. Then, the output of the reactor containing oxidized sulfur compounds was washed during an extraction process by dimethyl formaldehyde (DMF) and the sulfur content of the product was evaluated which reached the value of about 9936 ppm; i.e. about 41% desulfurization was achieved. A summary of the reaction conditions and obtained result is shown in Table 2 herein below.

Example 3: Oxidative Desulfurization of VGO in the Presence of Molybdenum Sulfide (MoS$_2$) (Macro) at 75° C.

An exemplary oxidative desulfurization reaction was performed in a batch reactor equipped with a stirrer. About 20 gr of the VGO feedstock containing about 16800 ppm sulfur (other specifications of the feedstock are presented in Table 1 herein below) was placed in the reactor and about 3% wt. of MoS$_2$ (macro) was added to reactor. Ozone gas was introduced into the reactor with a flow rate of about 400 ml/min at about 75° C. for about 8 hours. Then, the output of the reactor containing oxidized sulfur compounds was washed during an extraction process by dimethyl formaldehyde (DMF) and the sulfur content of the product was evaluated which reached the value of about 1732 ppm; i.e.

about 89% desulfurization was achieved. A summary of the reaction conditions and obtained result is shown in Table 2 herein below.

Example 4: Oxidative Desulfurization of VGO in the Presence of Molybdenum Sulfide (MoS$_2$) Quantum Dots An exemplary oxidative desulfurization reaction was performed in a batch reactor equipped with a stirrer. About 20 gr of the VGO feedstock containing about 16800 ppm sulfur (other specifications of the feedstock are presented in Table 1 herein below) was placed in the reactor and about 3 wt. % of exemplary MoS$_2$ quantum dots that were synthesized according to EXAMPLE 1 was added to reactor. Ozone gas was introduced into the reactor with a flow rate of about 400 ml/min at about 75° C. for about 8 hours. Then, the output of the reactor containing oxidized sulfur compounds was washed during an extraction process by dimethyl formaldehyde (DMF) and the sulfur content of the product was evaluated which reached the value of about 553 ppm; i.e. about 97% desulfurization was achieved. A summary of the reaction conditions and obtained result is shown in Table 2 herein below.

Example 5: Oxidative Desulfurization of VGO in the Presence of MoS$_2$ QDs/GO Hybrid Catalyst An exemplary oxidative desulfurization reaction similar to exemplary method 100 was performed in a batch reactor equipped with a stirrer. About 20 gr of the VGO feedstock containing about 16800 ppm sulfur (other specifications of the feedstock are presented in Table 1 herein below) was placed in the reactor and about 3 wt. % of exemplary synthesized MoS$_2$ QDs/GO catalyst that were synthesized according to EXAMPLE 1 was added to reactor. Ozone gas was introduced into the reactor with a flow rate of about 400 ml/min at about 75° C. for about 6 hours. Then, the output of the reactor containing oxidized sulfur compounds was washed during an extraction process by dimethyl formaldehyde (DMF) and the sulfur content of the product was evaluated which reached the value of about 410 ppm; i.e. about 98% desulfurization was achieved. A summary of the reaction conditions and obtained result is shown in Table 2 herein below.

A comparison between reaction conditions of exemplary oxidative desulfurization, catalyst type, catalyst consumption, and sulfur amount of the feedstock before and after desulfurization process may clarify the efficiency of the process, which are summarized in Table 2 herein below. Table. 2 shows the comparison between the performance criteria of different catalysts for oxidative desulfurization of VGO that were described through EXAMPLEs 2-5.

TABLE 1

Specifications of the Vacuum gas oil (VGO) feedstock
Distillation Range (° C.)

| Recovered mass % | BP (° C.) |
| --- | --- |
| Initial Boiling Point (IBP) at 760 mmHg | 195.8 |
| 5 | 265.6 |
| 10 | 290.8 |
| 20 | 330.4 |
| 30 | 349.4 |
| 40 | 363.8 |
| 50 | 376.4 |
| 60 | 387.6 |
| 70 | 398.4 |
| 80 | 408.4 |
| 90 | 419.8 |
| 95 | 428.0 |
| Final Boiling Point (FBP) | 705.8 |
| Total sulfur (ppm) | 16800 |
| Density at (15° C.) gr/cm$^3$ | 0.930 |
| Color (ASTM D1500) | 5.0 |

TABLE 2

Comparison between the performance of different catalysts used for oxidative desulfurization of VGO through EXAMPLEs 2-5

| | Reaction Conditions | | | | | | Sulfur Feed (ppm) | Sulfur Product (ppm) |
| --- | --- | --- | --- | --- | --- | --- | --- | --- |
| Example No. | Tem. (° C.) | Pressure (bar) | Fuel | Ozone flow rate (ml/min) | Other oxidant | Solvent/ bubbling N$_2$ | | |
| EXM. 2 | 25 | 1 | Vacuum gas oil | 400 | — | DMF (One times) | 16800 | 9936 |
| EXM. 3 | 75 | 1 | Vacuum gas oil | 400 | — | DMF (One times) | 16800 | 1732 |
| EXM. 4 | 75 | 1 | Vacuum gas oil | 400 | — | DMF (One times) | 16800 | 553 |
| EXM. 5 | 75 | 1 | Vacuum gas oil | 400 | — | DMF (One times) | 16800 | 410 |

Example 6: Oxidative Desulfurization of Heavy Diesel in the Presence of MoS$_2$ QDs/GO Hybrid Catalyst An exemplary oxidative desulfurization reaction similar to exemplary method 100 was performed in a batch reactor equipped with a stirrer. About 20 gr of the heavy diesel containing about 12000 ppm sulfur (other specifications of the feedstock are presented in Table 1 herein below) was placed in the reactor and about 3 wt. % of exemplary synthesized MoS$_2$ QDs/GO catalyst that were synthesized according to EXAMPLE 1 was added to reactor. Ozone gas was introduced into the reactor with a flow rate of about 400 ml/min at about 75° C. for about 6 hours. Then, the output of the reactor containing oxidized sulfur compounds was washed once during an extraction process by dimethyl formaldehyde (DMF) and the sulfur content of the product was evaluated which reached the value of about 100 ppm; i.e. about 99.2% desulfurization was achieved. A summary of the reaction conditions and obtained result is shown in Table 3.

TABLE 3

The oxidative desulfurization conditions and results for heavy diesel using MoS$_2$ QDs/GO hybrid catalyst

| Reaction Conditions | | | | | Sulfur Feed (ppm) | Sulfur Product (ppm) |
|---|---|---|---|---|---|---|
| Tem. (° C.) | Pressure (bar) | Fuel | Ozone flow rate (ml/min) | Other oxidant | Solvent/ bubbling N$_2$ | Feed (ppm) | Product (ppm) |
| 75 | 1 | Heavy diesel | 400 | — | DMF (One times) | 12000 | 100 |

Example 7: Oxidative Desulfurization of Kerosene in the Presence of MoS$_2$ QDs/GO Hybrid Catalyst An exemplary oxidative desulfurization reaction similar to exemplary method 100 was performed in a batch reactor equipped with a stirrer. About 20 gr of Kerosene containing about 2000 ppm sulfur (other specifications of the feedstock are presented in Table 1 herein below) was placed in the reactor and about 3 wt. % of exemplary synthesized MoS$_2$ QDs/GO catalyst that were synthesized according to EXAMPLE 1 was added to reactor. Ozone gas was introduced into the reactor with a flow rate of about 400 ml/min at about 75° C. for about 6 hours. Then, the output of the reactor containing oxidized sulfur compounds was washed once during an extraction process by dimethyl formaldehyde (DMF) and the sulfur content of the product was evaluated which reached the value of about 30 ppm; i.e. about 98.5% desulfurization was achieved. A summary of the reaction conditions and obtained result is shown in Table 4.

TABLE 4

The oxidative desulfurization conditions and results for Kerosene using MoS$_2$ QDs/GO hybrid catalyst

| Reaction Conditions | | | | | | Sulfur Feed (ppm) | Sulfur Product (ppm) |
|---|---|---|---|---|---|---|---|
| Tem. (° C.) | Pressure (bar) | Fuel | Ozone flow rate (ml/min) | Other oxidant | Solvent/ bubbling N$_2$ | Feed (ppm) | Product (ppm) |
| 75 | 1 | Kerosene | 400 | — | DMF (One times) | 2000 | 30 |

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for oxidative desulfurization of liquid hydrocarbon fuels, comprising:
   contacting a liquid fuel with a quantum dot hybrid catalyst in a reactor vessel, the quantum dot hybrid catalyst comprising metal sulfide quantum dots intercalated over graphene oxide layers;
   heating the reactor vessel to a temperature between 25° C. and 200° C.; and
   reducing sulfur content of the liquid fuel with a sulfur reduction amount of more than 95% wt., comprising:
      producing sulfone and sulfoxide compounds by oxidizing the liquid fuel with ozone gas in the presence of the quantum dot hybrid catalyst at the temperature between 25° C. and 200° C.; and
      separating the sulfone and sulfoxide compounds from the liquid fuel by extracting the sulfone and sulfoxide with an extraction solvent.

2. The method of claim 1, wherein contacting the liquid fuel with the quantum dot hybrid catalyst in the reactor vessel comprises adding the quantum dot hybrid catalyst to the reactor vessel containing the liquid fuel with a weight ratio of the quantum dot hybrid catalyst to the liquid fuel in a range between 1% wt. and 5% wt.

3. The method of claim 2, wherein contacting the liquid fuel with the quantum dot hybrid catalyst in the reactor vessel further comprises mixing the quantum dot hybrid catalyst and the liquid fuel in the reactor vessel with a mixing rate in a range between 200 rpm and 2000 rpm.

4. The method of claim 1, wherein heating the reactor vessel to the temperature between 25° C. and 200° C. comprises maintaining the reactor vessel at a temperature between 25° C. and 100° C.

5. The method of claim 1, wherein producing the sulfone and sulfoxide compounds by oxidizing the liquid fuel with the ozone gas in the presence of the quantum dot hybrid catalyst at the temperature between 25° C. and 200° C. comprises flowing the ozone gas into the reactor vessel while mixing the liquid fuel and the quantum dot hybrid catalyst in the reactor vessel at the temperature between 25° C. and 200° C.

6. The method of claim 1, wherein producing the sulfone and sulfoxide compounds by oxidizing the liquid fuel with the ozone gas in the presence of the quantum dot hybrid catalyst at the temperature between 25° C. and 200° C. comprises flowing the ozone gas into the reactor vessel with a flow rate between 100 ml/min and 700 ml/min for a period of time between 1 hour and 12 hours.

7. The method of claim 1, wherein separating the sulfone and sulfoxide compounds from the liquid fuel by extracting the sulfone and sulfoxide with the extraction solvent comprises extracting the sulfone and sulfoxide compounds from the liquid fuel using at least one of methanol, water, acetonitrile, sulfolane, dimethylformamide (DMF), and combinations thereof.

8. The method of claim 1, wherein the liquid fuel comprises a hydrocarbon fuel cut with a boiling temperature in a range between 38° C. and 750° C.

9. The method of claim 8, wherein the liquid fuel comprises at least one of naphtha, kerosene, diesel, gas oil, vacuum gas oil (VGO), mazot, atmospheric residue of petroleum, and combinations thereof.

10. The method of claim 8, wherein the liquid fuel comprises a hydrocarbon fuel cut with a sulfur content in a range between 50 ppm and 60000 ppm (6% wt.).

11. The method of claim 10, wherein the liquid fuel comprises a hydrocarbon fuel cut with a sulfur content in a range between 10000 ppm (1% wt.) and 60000 ppm (6% wt.).

12. The method of claim 1, wherein the metal sulfide quantum dots comprise at least one of molybdenum disulfide quantum dots ($MoS_2$ QDs), chromium sulfide quantum dots ($Cr_2S_3$ QDs), tungsten disulfide quantum dots ($WS_2$ QDs), nickel sulfide quantum dots ($Ni_3S_2$ QDs), and combinations thereof.

13. The method of claim 1, wherein the quantum dot hybrid catalyst comprises the metal sulfide quantum dots with a size between 0.5 nm and 5 nm.

14. The method of claim 1, wherein the quantum dot hybrid catalyst comprises a weight ratio of the metal sulfide quantum dots to the graphene oxide in a range between 0.02% wt. and 0.1% wt.

15. The method of claim 1, further comprising:
   synthesizing the quantum dot hybrid catalyst, comprising:
      synthesizing a suspension of the metal sulfide quantum dots; and
      intercalating the metal sulfide quantum dots between layers of graphene oxide.

16. The method of claim 15, wherein synthesizing the metal sulfide quantum dots comprises:
- forming a suspension by dispersing metal sulfide particles in a mixture of an alcohol and a chelating agent at a temperature between 20° C. and 40° C.;
- exfoliating the metal sulfide particles by sonicating the suspension with ultrasonic waves for a period of time between 10 minutes and 1 hour at a sonication power between 50 W/cm$^2$ and 300 W/cm$^2$; and
- forming the suspension of the metal sulfide quantum dots by separating a suspension of the exfoliated metal sulfide particles by centrifuging the sonicated suspension.

17. The method of claim 16, wherein the alcohol comprises at least one of methanol, ethanol, propanol, and combinations thereof.

18. The method of claim 16, wherein the chelating agent comprises at least one of polyvinylpyrrolidone (PVP), sodium dodecyl sulfate (SDS), potassium laurate (K-LAURATE), and combinations thereof.

19. The method of claim 15, wherein intercalating the metal sulfide quantum dots between layers of graphene oxide comprises:
- forming a metal sulfide/graphene oxide mixture by adding a solution of graphene oxide to the suspension of the metal sulfide quantum dots;
- stirring the metal sulfide/graphene oxide mixture for a time period between 15 minutes and 2 hours with a mixing rate between 200 rpm and 2000 rpm; and
- drying the stirred metal sulfide/graphene oxide mixture at a temperature between 50° C. and 200° C. for a period of time between 4 hours and 24 hours.

* * * * *